Oct. 11, 1938.　　　　　B. CHANCE　　　　　2,132,677
AUTOMATIC STEERING MEANS
Filed Aug. 5, 1936　　　　2 Sheets-Sheet 1
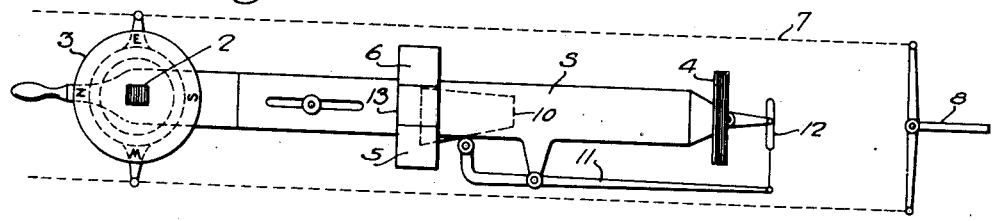
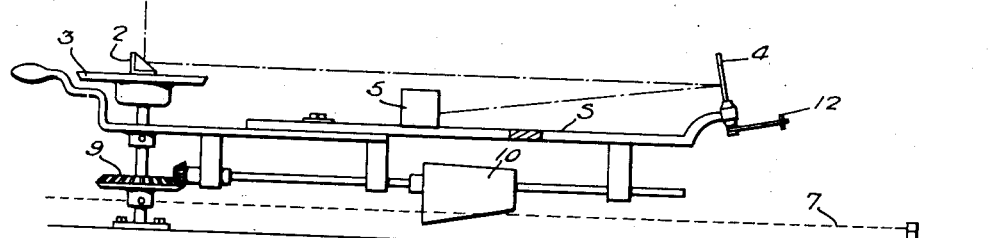
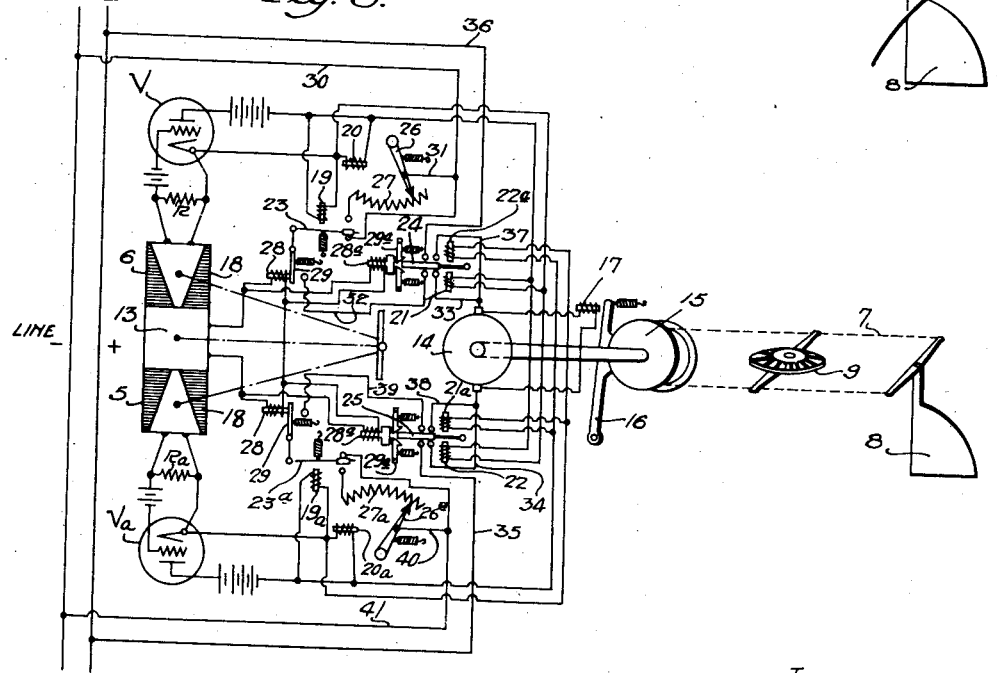
Inventor:-
Britton Chance
by his Attorneys
Howson & Howson Oct. 11, 1938.                    B. CHANCE                        2,132,677
                             AUTOMATIC STEERING MEANS
                              Filed Aug. 5, 1936              2 Sheets-Sheet 2
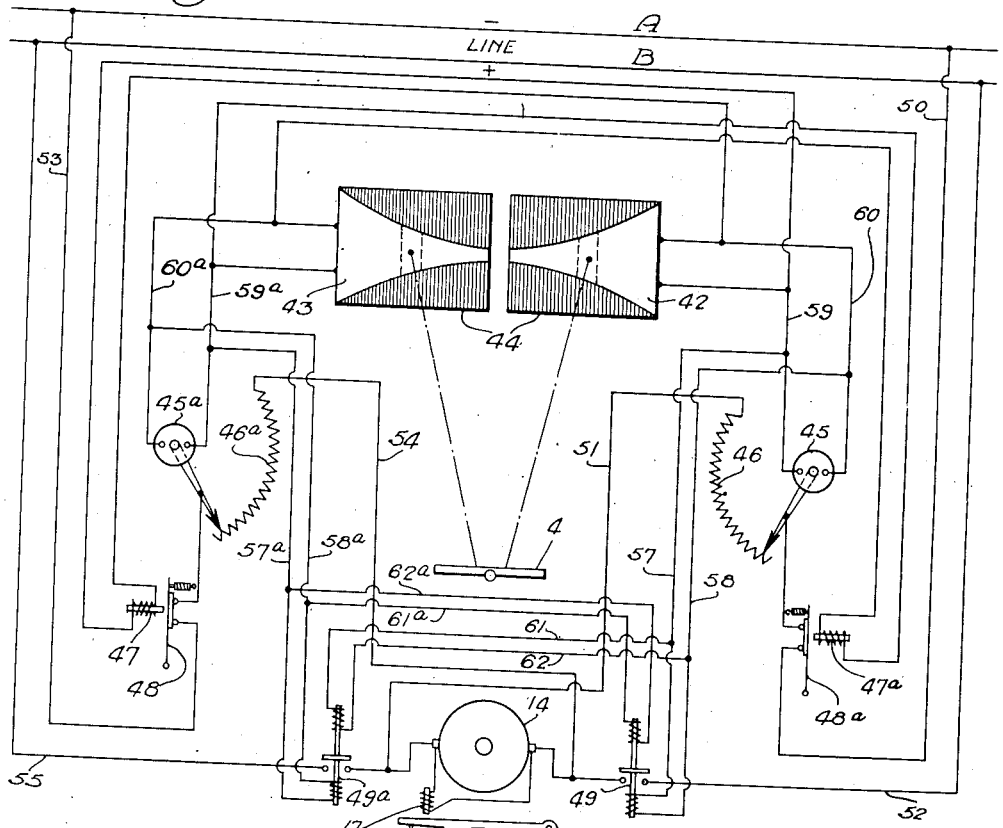
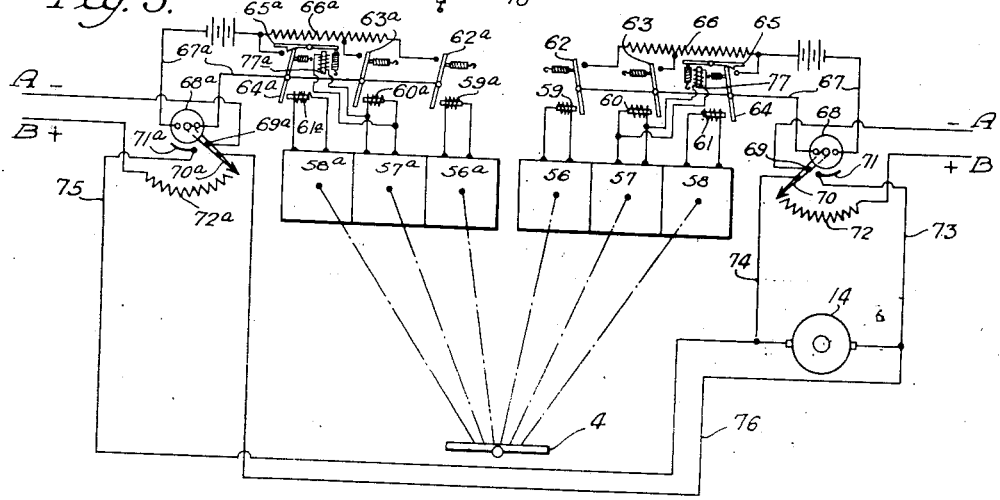
Inventor
Britton Chance
by his Attorneys
Howson & Howson Patented Oct. 11, 1938

2,132,677

UNITED STATES PATENT OFFICE 2,132,677

AUTOMATIC STEERING MEANS

Britton Chance, Mantoloking, N. J.

Application August 5, 1936, Serial No. 94,463

12 Claims. (Cl. 172—282)

This invention relates to steering apparatus for dirigible bodies or craft, and more particularly to a novel automatic steering apparatus for a craft having a steering element, such as a rudder. This application is a continuation in part of abandoned application, Serial No. 19,823, filed May 4, 1935. The present invention provides means whereby the torque of a steering motor is varied in accordance with the yaw or deviation of the craft from its course. More specifically, the torque of the steering motor is varied in predetermined relation to the amplitude and/or velocity and/or acceleration of the craft's deviation.

Another object of the invention is to provide a novel control device employing a beam of radiant energy, and means responsive to the beam for actuating a steering motor in the manner above mentioned, together with follow-back means for restoring the normal relation of the beam and the beam-responsive means. An important feature of the preferred form of the device resides in the provision of a time lag in the action of the follow-back mechanism, which is so designed in relation to the other parts of the system that the desired action of the steering motor is obtained.

Other objects and features of the invention will appear hereinafter as the description proceeds.

In the accompanying drawings:

Fig. 1 is a diagrammatic plan view of apparatus with which the present invention may be employed;

Fig. 2 is an elevational view of the same apparatus;

Fig. 3 is a diagrammatic illustration of one form of the invention;

Fig. 4 is a similar illustration of a modification; and

Fig. 5 is a similar view of a further modification.

In Figs. 1 and 2, there is illustrated rather diagrammatically a preferred form of the steering apparatus and associated optical system which may be employed in the practice of this invention. In these figures, 1 is an optical system which projects a ray or beam of light onto a reflector 2 mounted at the axis of a compass card 3 and operative to provide a ray of light fixed in space which falls upon the reflector or mirror 4 pivotally mounted on support S. The ray or beam is reflected by reflector 4 onto light-sensitive devices or cells 5, 6 and 13 carried by support S, the purpose of which will be clear from the description of the other figures of the drawings.

7 indicates follow-back mechanism from the rudder 8 which through the gearing 9 operates the cam 10, and the cam 10 operates follower 11 which turns the mirror 4 through loss motion connections 12. The support S may be mounted on gimbals and moves about the axis of the compass card when the craft deviates from its course but, of course, independently of the compass card. The support S, then, moves angularly the same amount and at the same rate as does the craft during deviation thereof. When the craft is on its course, the reflected beam falls on cell 13, but when the craft deviates from its course, the movement of support S causes the beam to sweep across cell 5 or cell 6, depending upon the direction of deviation. When desired, the course of the craft may be changed manually by disengaging gears 9 and moving support S by means of the handle provided as shown. This apparatus, which is disclosed and claimed in copending application, Serial No. 731,640, filed June 21, 1934, Patent No. 2,102,511, December 24, 1937, forms no limiting part of the present invention but is referred to as being typical or suggestive of the forms of apparatus with which the invention may be used.

Referring now to Fig. 3, in the specific form of the device there illustrated, the rudder-actuating motor is shown at 14 and is arranged to actuate the rudder through the drum 15 and the cables 7, the cables also serving as a part of the follow-back mechanism as above mentioned. A spring-biased brake 16 holds the drum 15 against rotation when the motor 14 is deenergized. An electromagnet 17 connected in shunt relation with the motor is adapted to render the brake 16 inoperative when the motor is energized.

Applied to each of the light-sensitive devices 5 and 6 is a screen or shade 18 having an opening of progressively increasing area so that when the beam of light or radiant energy sweeps outward across one of these cells, its effect is progressively augmented and this effect is reflected in the motor 14 so as to develop increasing output torque on the rudder, as will be explained presently. It will be obvious that the screens 18 may be shaped as desired to vary the output of the cells 5 and 6 in any desired manner in relation to the movement of the beam, which, of course, corresponds to deviation of the craft from its course. It will be seen that the output of the cells varies in predetermined relation with respect to the amplitude and/or velocity and/or acceleration of the deviation of the craft from its course. Obviously, other means may be employed to control the output of the cells as desired. For example, if a beam of substantial area is used, the variation in coincidence of the beam area with the cells may control the output of the cells. The control of the cell output may also be effected by using screens of varying transparency or by using light filters. Other such modifications will occur to persons skilled in the art.

The devices 5 and 6 have corresponding associated elements and it is necessary, therefore, to describe only the elements associated with device 6, for example, the corresponding elements associated with device 5 being designated by corresponding reference characters. Associated with the device 6 is a conventional vacuum tube amplifier V and there are included in the output circuit of the amplifier the coils or windings of electromagnets 19, 20, 21 and 22, these coils being in shunt relation with one another, as will be obvious. The electromagnets 19, 21 and 22 are adapted to actuate the spring-biased contact arms 23, 24 and 25, respectively. The electromagnet 20 is adapted to actuate the movable spring-biased arm 26 of resistor 27. Normally, these arms are in the positions shown, so that the motor 14 is deenergized and the brake 16 is applied. Electromagnets 28 are included serially in circuit with the cell 13 and these electromagnets are adapted to actuate contact arms 29. When the light beam falls on the central cell 13, as will be the case normally when the craft is on its course, the electromagnets 28 are energized and the arms 29 are in the position shown. The windings of electromagnets 28a are connected, respectively, in shunt relation with electromagnets 28, and are adapted to actuate spring-biased latch members 29a which are arranged co-operatively with arms 24 and 25, as will be explained further hereinafter. When the cell 13 is activated, the electromagnets 28a are energized and attract the latch members.

Let it be assumed now that the craft deviates from its course in a direction to cause the light beam to leave cell 13 and move across cell 6. The electromagnets 28 and 28a will be deenergized, allowing the contact arms 29 to close and allowing latch members 29a to move to operative position. As the output of the device 6 increases, a varying electrical potential or E. M. F. will be set up across resistor R, which potential varies in predetermined relation with respect to the amplitude and/or velocity and/or acceleration of the craft's deviation. Accordingly, the output of tube V varies in the same manner. The consequent energization of electromagnets 19, 20, 21 and 22 causes actuation of their associated arms, as above noted. The actuation of contact arms 23, 24 and 25 completes a circuit for motor 14 as follows: From line A through conductor 30, conductor 31, arm 26, resistor 27, arm 23, arm 29, conductor 32, arm 24, conductor 33, motor 14, conductor 34, arm 25, and conductor 35 to line B. As the current in the electromagnet winding 20 increases in the manner above mentioned, the arm 26 is moved accordingly to progressively cut out the resistance 27 in the motor circuit. Thus, the speed of the motor is varied in predetermined relation with respect to the amplitude and/or velocity and/or acceleration of the craft's deviation, and the rudder is actuated in like manner. The actuation of the rudder 8 causes follow-back action in the manner above mentioned to bring the beam back to normal relation with respect to the light cells, at which time, the electromagnets are deenergized, returning the contact arms to normal position and the motor 14 is consequently deenergized and the brake 16 is applied. The follow-back mechanism functions to move the reflector 4 on its pivot through the lost-motion connection 12, which introduces a time lag between the rudder actuation and the follow-back action. This time lag enables the actuation of the rudder in the above described manner. The time lag may be such as to give the desired operation in any instance. If desired, a time lag may also be introduced in the motor control mechanism, for example, by using slow acting relays or magnets.

To recapitulate the operation, the beam moves onto cell 6 with a certain velocity. The time lag in the action of the electrical circuit is, for example, one-half second. The energization which the motor receives is, therefore, a function of the distance that the beam moves across cell 6 during the one-half second, which corresponds to the velocity of the craft's yaw or deviation. The follow-back mechanism operates to keep the cells moving at a speed which is a predetermined fraction of the speed of motor 14. Thus, the motor is actuated in predetermined relation to the velocity of the craft's deviation.

Now suppose that the craft's deviation or yaw accelerates, there will then be a corresponding increase in the speed of motor 14. As the yaw or deviation decelerates, due to the action of the rudder, the motor speed will decrease and finally the motor will stop. The cycle may then be repeated. The time-lag in the follow-back action is an important feature, as it gives varying amounts of rudder action whenever the craft's yaw changes direction.

It will be noted that when electromagnets 21 and 22 operate, as above described, the arms 24 and 25 are latched in their actuated positions by latch members 29a. The purpose of this is to maintain the motor 14 energized if the beam should pass beyond the cell, which might be caused by excessive deviation of the craft. Should this happen, the electromagnets 19, 20, 21 and 22 would be deenergized. Arm 23 would then return to the position shown and would close a circuit directly through conductor 30. The arms 24 and 25 being latched, the motor will be connected directly across the line and will continue to actuate the rudder with maximum torque. Upon return of the beam to cell 13, the electromagnets 28a will attract latch members 29a, allowing the arms 24 and 25 to return to their normal positions.

It will be apparent that if the cells are of such dimension that the beam cannot pass beyond them, even when excessive deviations of the craft take place, the latching feature need not be provided.

When the craft deviates from its course in such direction as to cause the light beam to traverse the cell 5, the motor is operated in the other direction by virtue of its being energized through a circuit which may be readily traced as above through the parts associated with the cell 5. In such case, the energization of the motor will be effected by closure of a circuit as follows: From line B, through conductor 36, arm 24, conductor 37, motor 14, conductor 38, arm 25, conductor 39, arm 29, arm 23a, resistor 27a, arm 26a, conductor 40 and conductor 41 to line A. The latching of arms 24 and 25 in this instance will be clearly understood from the above discussion.

As stated above, the tubes V and Va may be conventional tubes and, if desired, more than one tube may be associated with each of the cells 5 and 6, as will be well understood. Moreover, the tubes may be operated in any known and suitable manner. For example, they may be biased to cut-off by means of the biasing batteries in their grid circuits so that no current would flow in the output circuits of these tubes until the bias is overcome by the voltage developed across the resistor R or Ra by the associated light cell. In this manner, the vacuum tubes may be caused to function as "off" and "on" relay devices. It will be apparent also that the operating characteristics of the tubes may be used as a control medium to vary the output and the rudder actuation in a desired manner. Of course, if the steady-state plate current of the tubes is allowed to flow through the electromagnets, the latter will be of such design that they will not be energized until the current is caused to increase by the action of the light cells.

In Fig. 4, there is shown a modification wherein two light sensitive devices or cells 42 and 43 are employed, the screens 44 being adapted to control the amount of light falling on the devices and thus controlling the output thereof. In this instance, the cells 42 and 43 are connected directly and respectively to electrically operated rheostats 45 and 45a, the resistors 46 and 46a of which are adapted to function in the manner of resistors 27 and 27a of Fig. 3. The coils or windings of electromagnets 47 and 47a are connected respectively across the circuits of cells 42 and 43. These electromagnets are adapted to actuate the contact arms 48 and 48a, respectively. There are also provided double acting relays 49 and 49a, the lower winding of relay 49 and the upper winding of relay 49a being connected in shunt relation with each other across the circuit of cell 42, while the lower winding of relay 49a and the upper winding of relay 49 are connected in shunt relation across the circuit of cell 43.

Normally, when the craft is on its course, the light beam will be reflected by reflector 4 into the space between the cells or onto the cells equally, depending upon the beam area, and the parts will be in the positions shown, the current, if any, flowing through the relays and electromagnets at this time being insufficient to actuate them. Moreover, the windings of relays 49 and 49a will be in balanced relation as will be obvious. At such time, the motor circuit will be open.

Let it be assumed now that the craft deviates from its course in such direction as to cause the light beam to move toward the right, as viewed in Fig. 4. The light beam will then fall upon cell 42 or will fall increasingly on cell 42 and decreasingly on cell 43. This will cause energization of electromagnet 47, rheostat 45, the lower winding of relay 49, and the upper winding of relay 49a. The actuation of arm 48 by electromagnet 47 opens the branch circuit through resistor 46a. Since the current through the lower winding of relay 49 is increasing while that, if any, through the upper winding of the relay is decreasing, the relay will be closed. At the same time, the current, if any, through the lower winding of relay 49a is decreasing, while the current through the upper winding of that relay is increasing, thereby maintaining the relay in opened condition. A circuit is now completed for the motor 14 which may be traced as follows:—From line conductor A through conductor 50, arm 48a, resistor 46, conductor 51, motor 14, closed relay 49, and conductor 52 to the other line conductor B. The resistance 46 which is thus included in the motor circuit is progressively decreased, thereby increasing the torque of the motor in predetermined relation with respect to the amplitude and/or velocity and/or acceleration of the craft's deviation, as above explained. The remainder of the operation will be obvious from the previous discussion.

It will be seen that this system employs only two light cells, but there is no provision for maintaining the motor energized if the light beam goes beyond the cells. Therefore, the cells should be of such design as to prevent this. It will be understood, of course, that amplifier tubes may be employed as before.

When the craft deviates in the opposite direction so as to cause increased activation of cell 43 and simultaneous decreased activation of cell 42, the elements associated with the cells will function in a manner which will now be obvious to complete a circuit for the motor which may be traced as follows:—From line conductor A through conductor 53, arm 48, resistor 46a, conductor 54, motor 14, relay 49a, and conductor 55 to the other line conductor B. It will be seen that the motor is energized in the reverse manner with respect to the energization above discussed and therefore the rudder will be actuated in the opposite direction to bring the craft back on its course.

In the further modification of Fig. 5, two groups of cells are employed, one group comprising, for example, cells 56, 57, 58, while the other group comprises corresponding cells 56a, 57a, 58a. Considering one group of cells, as an example, the cells 56, 57, 58 have connected thereto the windings of electromagnets 59, 60 and 61, respectively. These magnets are adapted to actuate the pivoted arms 62, 63 and 64, respectively. The last arm 64 has a pivoted latching arm 65 associated with it as illustrated. A common resistor 66 is associated with the arms 62, 63 and 64 in the manner illustrated so that different portions of the resistor may be included in the energizing circuit 67 of an electrically operable rheostat 68. The arm of the rheostat carries insulated contact portions 69 and 70 which are adapted to engage the stationary contact 71 and the resistor 72, respectively.

Assuming that the craft deviates in such direction as to cause the light beam to traverse the group of cells 56, 57 and 58, it will be seen that activation of the cell 56 will close the circuit 67 and cause inclusion therein of the entire resistor 66. When the cell 57 is activated, a portion of resistor 66 is short-circuited as will be obvious. Finally, when the cell 58 is energized, the entire resistor 66 is excluded from the circuit 67. Thus, the current flow through the electrical rheostat 68 is increased progressively with the travel of the light beam and, in turn, causes progressive operation of the rheostat arm to gradually cut out the resistance 72 included in the circuit of motor 14. When the rheostat is actuated initially, it closes the energizing circuit for the motor as follows:—From supply line A, through contacts 69 and 71, conductor 73, motor 14, conductor 74, contact 70 and resistor 72 to supply line B.

The latching of arm 64 maintains the energization of relay 68 until the beam again traverses cell 57, at which time the electromagnet 77 is energized and attracts the latch member 65, thus releasing arm 64. This feature maintains the motor energized in the event that the beam passes beyond the cells, as will be apparent from the previous discussion.

When the craft deviates in the opposite direction to cause successive activation of cells 56a, 57a, 58a, the elements associated with those cells will function in a manner which will be obvious from the above discussion, in which case, the motor 14 will be operated in the reverse direction by a circuit as follows: From supply line A, through contacts 69a and 71a, conductor 75, motor 14, conductor 76, contact 70a, and resistor 72a to the other supply line B.

The motor 14 is, of course, actuated in predetermined relation to the amplitude and/or velocity and/or acceleration of the craft's deviation, and the system may be designed to enhance this operation, as above set forth.

It will be seen that the invention in any of its forms embodies the cooperative association of elements which are capable of flexibility of design or adaptation to accomplish the desired purpose. Although several embodiments of the invention have been illustrated and described for the purpose of disclosure, it will be understood that the invention is not thus limited but is capable of further modification without departing from its scope.

I claim:

1. Apparatus for controllably actuating an element on a dirigible craft, such as a rudder, comprising means for providing a beam of radiant energy, means responsive to said beam, means for causing said beam to activate said beam-responsive means in response to deviation of the craft from its course, electrical means for actuating said element, variable impedance means for varying the action of said actuating means, means including said beam-responsive means for varying said impedance means to operate said actuating means in predetermined relation to the amplitude, velocity and acceleration of the craft's deviation from its course, and follow-back means responsive to the actuation of said element for restoring the normal relation between said beam and said beam-responsive means.

2. Apparatus for controllably actuating an element on a dirigible craft, such as a rudder, comprising means for providing a beam of radiant energy, means responsive to said beam, means for causing said beam to activate said beam-responsive means in response to deviation of the craft from its course, a reversible motor for actuating said element, variable impedance means for varying the action of said motor, means controlled by said beam-responsive means for actuating said motor in either direction and for varying said impedance means to thus vary the torque of said motor in accordance with the amplitude of deviation of the craft from its course, and follow-back means responsive to the actuation of said element for restoring the normal relation between said beam and said beam-responsive means.

3. Apparatus for controllably actuating an element on a dirigible craft, such as a rudder, comprising means for providing a beam of radiant energy, means responsive to said beam, means for causing said beam to activate said beam-responsive means in response to deviation of the craft from its course, a motor for actuating said element, an impedance included in circuit with said motor, means including said beam-responsive means for actuating said motor and for varying said impedance in a manner to vary the torque of said motor in predetermined relation to the amplitude and velocity of the craft's deviation from its course, and follow-back means responsive to the actuation of said element for restoring the normal relation between said beam and said beam-responsive means.

4. Apparatus for controllably actuating an element on a dirigible craft, such as a rudder, comprising means for providing a beam of radiant energy, a plurality of devices selectively responsive to said beam, means for effecting relative movement between said beam and said devices in response to deviation of the craft from its course, whereby one of said devices is selectively activated, a motor for actuating said element, means including the activated device for actuating said motor and for varying the torque thereof in accordance with the amplitude of the craft's deviation from its course, means for maintaining the actuation of said motor regardless of the amplitude of the craft's deviation, follow-back means responsive to the actuation of said element for restoring the normal relation between said beam and said devices, and means responsive to the restoration of said normal relation for rendering said maintaining means ineffective.

5. Apparatus for controllably actuating an element on a dirigible craft, such as a rudder, comprising means for providing a beam of radiant energy, a plurality of devices responsive to said beam, means for causing said beam to sweep across said devices in response to deviation of the craft from its course, screening means associated with said devices for varying the effectiveness of the devices in predetermined relation to the amplitude of the craft's deviation from its course, electrical means for actuating said element, impedance means in circuit with said actuating means, means controllable by said devices for operating said actuating means and varying said impedance means, whereby said element is actuated in predetermined relation to the amplitude of the craft's deviation from its course, and follow-back means responsive to the actuation of said element for restoring the normal relation between said beam and said devices.

6. Apparatus for controllably actuating an element on a dirigible craft, such as a rudder, comprising means for providing a beam of radiant energy, a group of devices responsive to said beam, means for causing said beam to sweep across said devices in response to change of the course of the craft, an impedance associated with said devices, means controllable by said devices for rendering varying portions of said impedance effective in accordance with the sweep of said beam, means for actuating said element, means responsive to the varying effectiveness of said impedance for operating said actuating means, whereby said element is actuated in accordance with the amplitude of change of the craft's course, and follow-back means responsive to the actuation of said element for restoring the normal relation between said beam and said devices.

7. Apparatus for controllably actuating an element on a dirigible craft, such as a rudder, comprising means for providing a beam of radiant energy, means responsive to said beam, means for causing said beam to activate said beam-responsive means in response to deviation of the craft from its course, a motor for actuating said element, an impedance normally out of circuit with said motor, means responsive to said beam-responsive means for including said impedance in circuit with said motor and for varying said impedance in a manner to vary the torque of said motor in predetermined relation to the amplitude and velocity of the craft's deviation from its course, and follow-back means responsive to the actuation of said element for restoring the normal relation between said beam and said beam-responsive means.

8. Apparatus for controllably actuating an element on a dirigible craft, such as a rudder, comprising means for providing a beam of radiant energy, means responsive to said beam, means for causing said beam to activate said beam-responsive means in response to deviation of the craft from its course, a motor for actuating said element, an impedance normally out of circuit with said motor, means responsive to said beam-responsive means for including said impedance in circuit with said motor and for cutting said impedance out of circuit with the motor at a rate dependent upon the velocity of the craft's deviation from its course, and follow-back means responsive to the actuation of said element for restoring the normal relation between said beam and said beam-responsive means.

9. Apparatus for controllably actuating an element on a dirigible craft, such as a rudder, comprising means for providing a beam of radiant energy, a plurality of devices selectively responsive to said beam, means for effecting relative movement between said beam and said devices in response to deviation of the craft from its course, whereby one of said devices is selectively activated, a motor for actuating said element, circuit means responsive to said activated device for actuating said motor and for varying the torque thereof in accordance with the amplitude of the craft's deviation from its course, latching means operable by said circuit means for maintaining the actuation of said motor regardless of the amplitude of the craft's deviation, follow-back means responsive to the actuation of said element for restoring the normal relation between said beam and said devices, and means responsive to the restoration of said normal relation for rendering said latching means ineffective.

10. Apparatus for controllably actuating an element on a dirigible craft, such as a rudder, comprising means for providing a beam of radiant energy, a plurality of devices selectively responsive to said beam, means for effecting relative movement between said beam and said devices in response to deviation of the craft from its course, whereby one of said devices is selectively activated, a reversible motor for actuating said element, circuit means controlled by one of said devices for actuating said motor in one direction, other circuit means controlled by another of said devices for actuating said motor in the opposite direction, variable impedance means in each of said circuit means for varying the torque of said motor in accordance with the amplitude of the craft's deviation from its course, and follow-back means responsive to the actuation of said element for restoring the normal relation between said beam and said devices.

11. Apparatus for controllably actuating an element on a dirigible craft, such as a rudder, comprising electrical means for actuating said element, impedance means in circuit with said actuating means, means including a beam of radiant energy and a plurality of beam-responsive devices for varying said impedance in accordance with the amplitude of the craft's deviation from its course, whereby said element is actuated accordingly by said actuating means, and follow-back means responsive to the actuation of said element for restoring the normal relation between said beam and said devices.

12. Apparatus for controllably actuating an element on a dirigible craft, such as a rudder, comprising means for providing a beam of radiant energy, two groups of devices responsive to said beam, means for causing said beam to sweep across one or the other of said groups of devices in response to change of the course of the craft in one direction or the other, an impedance associated with each group of devices, means controllable by each group of devices for rendering varying portions of the associated impedance effective in accordance with the sweep of said beam, means for actuating said element, means responsive to the varying effectiveness of one of said impedances for operating said actuating means in one direction, means responsive to the varying effectiveness of the other impedance for operating said actuating means in the opposite direction, whereby said element is actuated in accordance with the direction and amplitude of change of the craft's course, and follow-back means responsive to the actuation of said element for restoring the normal relation between said beam and said devices.

BRITTON CHANCE.